UNITED STATES PATENT OFFICE.

GEORGE H. WIGTON, OF EUREKA, UTAH.

METHOD OF TREATING SILICIOUS ORES.

1,264,586.  Specification of Letters Patent.  Patented Apr. 30, 1918.

No Drawing.  Application filed September 22, 1916.  Serial No. 121,696.

*To all whom it may concern:*

Be it known that I, GEORGE H. WIGTON, a citizen of the United States, residing at Eureka, in the county of Juab and State of Utah, have invented a certain new and useful Method of Treating Silicious Ores; and I do hereby declare the following to be a full, clear, and exact description of the same.

My invention relates to the treatment of pulverized or otherwise finely divided silicious metal bearing ores and is more especially adapted for the treatment of low grade ores or materials which are restricted to a content of base metal insufficient to cause fusion or agglomeration at the volatilization temperature of the metallic compound content of the ore.

It is well known that oxidized ores of lead, gold and silver containing the lead bullion in the form of carbonate, may be profitably treated in a blast furnace for the production of lead bullion in the usual way, if the proportion of metal in the ore is sufficient to warrant the expense of the recovery of the metal. Many ores of this type, however, contain a large percentage of silica in proportion to the metal content and in such cases the cost of smelting is either prohibitive or constitutes such an extremely large percentage of the gross value of the ore that the profit derived is too small to warrant the trouble and expense. Concentration by the usual mechanical separating methods of this type of ore is also not always profitable on account of the small recoveries obtained. The object of the present invention is to provide an improved method of recovering the metal content of ores which contain a comparatively small percentage of metal in proportion to the silica, which process will result in a metal recovery great enough and can be carried out cheap enough to warrant the treatment of ores of this character.

In the case of low grade ores, the cost of smelting is far too great to justify the treatment of the ore, the amount of metal recovered being frequently less than the cost of the smelting. Consequently, heretofore, such low grade ores have been thrown away and although they contain a fair percentage of valuable metal, the metal has been altogether wasted. This waste will be eliminated in carrying out the present method wherein the treatment of low grade ores results in a very high metal recovery as compared with the percentage of metal in the ore. If an ore containing various metals one of which is lead, for example, be mixed with an alkaline or alkaline earth chlorid, for example, any chlorid such as sodium chlorid NaCl and the mixture be subjected to heat, a chemical reaction takes place resulting in the chloridizing of the metal in the ore. Assuming that the metal in the ore be lead carbonate $PbCO_3$ and that the carbonate is mixed with sodium chlorid, NaCl, the mixture on being heated results in a formation of sodium oxid $Na_2O$, the evolution of carbon dioxid $CO_2$ and the formation of lead chlorid $PbCl_2$. The lead fuses as a chlorid, or other compound containing chlorin and subsequently volatilizes under favorable conditions and passes off with the carbon dioxid. The following equation is illustrative of such a reaction:

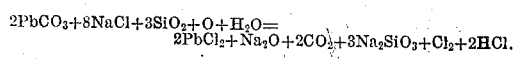

It will be noted that the amount of base metal present in the original ore is unchanged in its chemical equivalent or the metal chlorid formed in the reaction. By raising the temperature in an oxidizing atmosphere which may be obtained by applying a current of air or gas to lower the vapor tension of the fused chlorid, volatilization of the fused chlorid will proceed to completion if all the particles of the fused chlorid are freely exposed to the current of air or gas. The above will actually take place if the combining quantities of the lead carbonate and sodium chlorid are present in the mixture and the lead carbonate and sodium chlorid are the only elements of the mixture. However, the ore to be treated contains silica in large quantities usually in the form of an oxid $SiO_2$ and if enough base metal such as $PbCO_3$ be present in the ore so that the mixture is identical in composition with a slag, the formation temperature of which is below the temperature of volatilization of the metal compound, a fused or sintered mass will result which is unlike the fusion preceding volatilization of the metal as a compound containing chlorin. When heat is applied to a mixture of lead carbonate and sodium chlorid in their combining quantities the $PbCO_3$ decomposes first into carbon dioxid, $CO_2$, and lead oxid PbO, next the oxygen atom in the lead oxid exchanges with the chlorin atoms in the sodium chlorid resulting in lead chlorid and sodium oxid as follows:

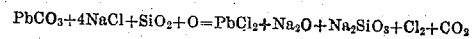

If fusion of any of the silica with the base metal takes place and the lead oxid has changed into the chlorid, complete volatilization of the metal as chlorid can not be accomplished. Either a slag film is formed over the metal which prevents chloridizing by preventing contact with the chloridizing agent NaCl, or, if the chlorid is formed, complete volatilization would be retarded for the reason that proper exposure to the current of air would be prevented. In the case of a mixture of ore with a high metallic content and sodium chlorid, the following equation is illustrative of the result:

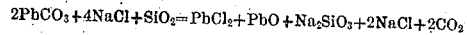

The sodium silicate or slag would form a protective coating about the lead oxid PbO and partially or wholly prevent contact with the chloridizing agent NaCl and also prevent exposure of all parts of the mixture to the current of air or gas.

From the above it is evident that oxidizing conditions are necessary in carrying out the reaction between the metal in the ore and the alkaline earth chlorid, in other words, all chloridized particles of the metal must be exposed to the current of air or gas in order to obtain complete volatilization of the metal as a chlorin content. This condition may be brought about by grinding the ore fine enough to permit proper chloridization and by maintaining the mixture in its granular state throughout the reaction. In accordance with the present invention it is proposed to maintain the granular state of the mixture by so regulating the composition of the charge that the mixture resulting from the chemical reaction during chloridization would form a slag only at a higher temperature than the temperature at which the furnace is operated, in other words, higher than the temperature of volatilization of the metal compound as a chlorin content. As has been stated before the amount of metal which will be volatilized as a result of the chemical reaction between the chloridizing agent and the metal is dependent upon the amount of metal in the original ore and an excess amount of metal in the original ore will cause the formation of a slag or sintered mass at a temperature lower than the temperature of volatilization thereby retarding or preventing complete volatilization and resulting in a large waste of metal. Consequently, it is essential to my invention that the amount of metal in the ore or material to be treated be limited so that no slag formation takes place at the furnace temperature of volatilization. This is necessary in order that a thorough exposure of all particles of metal to the chloridizing agent and to the current of air or gas be effected and will result in practically complete volatilization.

Two types of ores suggest themselves as being readily amenable to the method of the present invention. The first type includes the raw ore which contains such a small proportion of base metal that when subjected to ordinary treatment the recovery would be insufficient to warrant the trouble and expense. The second type may contain a higher proportion of base metal which would be great enough to warrant a preliminary mechanical separation or concentration treatment with the production of a high grade concentrate. The concentrate of course can be very profitably treated by a direct smelting process in the usual way. While the residue, after the ore gas has been subjected to the concentration treatment, still contains a considerable amount of valuable metals, still the proportion of the metal relatively to the silica would be insufficient to warrant smelting, although recovery of the metal can be obtained with a profit by the use of my method.

In carrying out my invention a proportion of metal bearing ore such, for example, as a silicious ore containing lead in the form of a carbonate and in a proportion insufficient to cause the formation of a slag or agglomeration at the volatilizing temperature of the metal content of the ore, is first subjected to a crushing process. This may be carried out by placing the ore in a coarse crusher and then in a crusher of finer mesh. The crushed ore is mixed with a quantity of an alkaline or alkaline earth chlorid, for example, sodium chlorid. The proportion of chlorid must be in excess of the combining quantity necessary to effect chloridizing of the metal content of the ore, for the reason that usually a portion of the sodium chlorid volatilizes before complete chloridizing of the metal in the ore can take place, and there must be enough chloridizing agent in the mixture to effect volatilization of the metal. The proportion of chloridizing agent necessary may readily be determined by computing the metal content of the ore in accordance with the usual assaying process and by experiment it has been found that to five parts, by weight, of base metal in the ore, ten parts, by weight, of chloridizing agent is usually sufficient, although the proportion of chloridizing agent may be increased or decreased if desired.

The mixture of ore and chloridizing agent is next put into a dryer and then pulverized, preferably to as fine a pulverulent condition as possible. After this step has been carried out the mixture is subjected to a slow heat under oxidizing conditions in a roaster of any preferred type until it glows with a dull red glow. Volatilization usually is effected at temperatures ranging from 850° to 1,000° C. the volatile metal chlorid passing out of the roaster with the gas.

Any preferred method of recovering the volatile chlorid may be employed, for example, the metallic chlorid or fume may be recovered by the well known bag-house treatment, e. g., by permitting the fume and gas from the roaster to pass through woolen bags which catch the solid particles of metal chlorids or chlorin compound held in suspension in the gas. Or the compounds of metal with chlorin may be separated from the gas in a Cottrell apparatus. The calcine or refuse from the roaster will be found to contain practically no traces of metal.

After the metallic chlorin compounds have been collected they are next mixed with a carbonaceous compound such as ground coal or coal dust and a proportion of ground lime rock or other alkaline earth carbonate such as magnuesite or dolomite or $CaCl_2$. The coal dust is used as a reducing agent and the lime rock as a flux. The mixture is then placed in a reducing furnace and heated to a smelting temperature, which may be approximately 800° C. In the furnace the chlorids of metal are converted into bullion, in the present instance, lead bullion, and the slag consisting of an alkaline or alkaline earth chlorid in which practically all of the chlorin is recovered. The slag from the reducing furnace may be used and in fact is intended to be used as the chloridizing agent for the next charge of ore to be treated.

It will be evident that any preferred chloridizing agent may be used in carrying out the above process. For example, a mixture of sodium chlorid and calcium chlorid may be employed instead of sodium chlorid, or calcium chlorid alone may be employed. The process is also equally amenable to ores containing large proportions of silver or gold or both relatively to the lead and other metal. Sulfid ores may be prepared for the process by giving them an oxidizing roast or subjecting the ores to volatilization or also by maintaining a highly oxidizing atmosphere in the volatilization furnace.

What is claimed is:

1. The method of treating finely ground silicious ores or materials restricted to a content of base metal insufficient to cause the formation of a slag or agglomeration at the volatilizing temperature of the metallic compound content of the ore, which consists in mixing the ore with a proportion of alkaline or alkaline earth chlorid in excess of the combining quantity necessary to effect chloridizing of the metal content of the ore, heating the mixture under oxidizing conditions to a furnace temperature sufficient to volatilize the metal as a chlorin compound, recovering the volatilized metal chlorin compound, adding to the recovered metal chlorin compound, a reducing agent and a flux and forming a mixture; heating the mixture to a furnace temperature sufficient to reduce the metal to its free state and recovering the chlorin as alkaline or alkaline earth compounds in the form of a slag.

2. The method of treating finely ground silicious ores or materials restricted to a content of base metal insufficient to cause the formation of a slag or agglomeration at the volatilizing temperature of the metallic compound content of the ore, which consists in mixing the ore with a proportion of alkaline or alkaline earth chlorid in excess of the combining quantity necessary to effect chloridizing of the metal content of the ore, heating the mixture under oxidizing conditions to a furnace temperature, sufficient to volatilize the metal as a chlorin compound, recovering the volatilized metal chlorin compound, adding to the recovered metal chlorin compound, a reducing agent and a flux, and forming a mixture, heating the mixture to a furnace temperature sufficient to reduce the metal to its free state, recovering the chlorin as alkaline or alkaline earth compounds in the form of a slag, and mixing the slag so formed with a new charge of the ore to be treated.

3. The process of treating the low-grade residue obtained by subjecting silicious ores having a high content of base metal to a mechanical process for separating the ore into concentrate and such residue, mixing the low grade residue with a proportion of alkaline or alkaline earth chlorid in excess of the combining quantity necessary to effect chloridizing of the metal content, heating the mixture under oxidizing conditions to a furnace temperature sufficient to volatilize the metal as a chlorin compound, and the recovering the volatilized metal chlorin compound.

4. The method of treating finely ground silicious ores or materials restricted to a content of base metal insufficient to cause the formation of a slag or agglomeration at the volatilizing temperature of the metallic compound content of the ore, which consists, in mixing the ore with a proportion of alkaline or alkaline earth chlorid in excess of the combining quantity necessary to effect chloridizing of the metal content of the ore, heating the mixture under oxidizing conditions to a furnace temperature sufficient to volatilize the metal as a chlorin compound, adding to the recovered metal chlorin compound a carbonaceous substance as a reducing agent and a proportion of an alkaline earth carbonate as a flux, and forming a mixture, and heating the mixture to a furnace temperature sufficient to reduce the metal to its free state, and recovering the chlorin as alkaline or alkaline earth compounds in the form of a slag, and mixing the slag so formed with a new charge of the ore to be treated.

GEORGE H. WIGTON.